United States Patent Office 3,467,695
Patented Sept. 16, 1969

3,467,695
(ISOCYANATOETHYLTHIO)CARBOXYLATES
Hans Holtschmidt, Cologne-Stammheim, and Gunther Nischk and Eberhart Degener, Leverkusen, Germany, assignors to Farbenfabriken Bayer Aktiengesellschaft, Leverkusen, Germany, a corporation of Germany
No Drawing. Continuation of application Ser. No. 131,503, Aug. 15, 1961. This application Dec. 18, 1964, Ser. No. 419,570
Claims priority, application Germany, Aug. 25, 1960, F 31,974
Int. Cl. C07c 149/20, 119/04
U.S. Cl. 260—481         3 Claims This invention relates to organic isocyanates and a method of producing the same. More particularly, it relates to a method of preparing organic isocyanates containing a thioether linkage.

This application is a continuation of application Ser. No. 131,503, filed Aug. 15, 1961, now abandoned.

It has been heretofore known that mercaptans can be easily added to the double bonds of an ethylenically unsaturated compound. In a like manner, in many cases, amino groups or their salts can also be added to the double bonds of ethylenically unsaturated compounds, such as, for example, substituted asparagic acid esters are obtained in good yields by adding amines or their salts to fumaric acid esters and cyanethylation products are obtained in good yield by adding amines to acrylonitrile.

It is also known that primary amines can be reacted with phosgene to produce the corresponding isocyanates.

It is further known to produce isocyanates containing thioether linkages by preparing in a first step an alkyl mercaptoacetic acid by reacting a high molecular weight alkyl mercaptan with an alkali metal chloracetate, reacting the alkyl mercaptoacetic acid with thionyl chloride to produce the acid chloride of the high molecular weight mercaptoacetic acid, then reacting this compound with an excess of sodium azide to produce the azide of the alkyl mercaptoacetic acid, which, upon refluxing, is converted into the corresponding isocyanate. This method, however, is disadvantageous for the reason that the alkyl radical must have at least ten carbon atoms. Further, the process is lengthy and includes many steps, including distillation under vacuum and refluxing. In the course of the reaction by-products are obtained which need to be separated and afford additional processing steps.

It is, therefore, an object of this invention to provide an improved method of preparing isocyanates containing thioether linkages. It is another object of this invention to provide a method of preparing a primary amine containing a thioether linkage which, when phosgenated, yields the corresponding isocyanate without undesired by-products in the course of reaction which must be separated. It is still another object of this invention to provide primary amines containing thioether linkages.

The foregoing objects, and others which will become apparent from the following description, are accomplished in accordance with the invention, generally speaking, by providing a method for preparing organic isocyanates containing thioether linkages by the addition reaction of amino mercaptans containing primary amino groups or the salts thereof with an unsaturated compound containing activated double bonds and reacting the amines obtained with phosgene to produce the corresponding isocyanates.

More particularly, the invention contemplates the reaction of a compound containing both a mercapto group and a primary amino group with an ethylenically unsaturated compound, which has been activated at the double bonds, to produce a compound having primary amino groups and thioether linkages at the point where the amino mercaptans add to the unsaturated compound. Although both amino groups and mercapto groups will add to activated double bonds, it has been found that the mercapto groups will consistently and preferentially enter into the addition reaction resulting in the production of a primary amine containing thioether linkages. By "thioether linkages" we mean the addition of the sulfur of the mercapto group to the activated double bonded carbon atoms to eliminate the unsaturation at the double bond.

The addition reaction to form the primary amine containing thioether linkages is generally conducted by dissolving the amino mercaptan, which is preferably in the salt form, such as, for example, the hydrochloride, sulfate, or sulphonate, in a suitable solvent, preferably an inert polar solvent such as lower molecular weight alcohols, ethers, and ketones. Examples of polar solvents which may be employed are methanol, ethanol, acetone, diethyl ether, and the like. A calculated quantity of unsaturated compound is then added to the amino mercaptan solution. In other words, one mercapto group is provided for each —C=C— bond. If, of course, a lesser amount of amino groups is intended in the reaction product, it is possible to proceed with a deficiency of mercaptans, the nonreacted —C=C— bonds being then left after the addition reaction. In practice, however, the amino mercaptan and unsaturated compound are reacted together in such amounts that one —C=C— bond corresponds with one SH-group. Analytic quantities of strong tertiary amines, such as N-methyl piperidine, trimethyl amine, N-dimethyl benzyl amine, triethylene diamine, tribenzyl amine, N-methyl morpholine, tributyl amine, dibutyl hexyl amine or bis(p-dimethyl amino)hexahydrobenzene, are to be added to insure a smooth reaction to form thioether groups. An amount of a tertiary amine catalyst of from about 0.5% to about 30% is preferred. The yield can be improved by heating to a temperature of from about 50° to about 120° C. In many instances, the yield is quantitative, thus rendering the isolation and purification of the amine intermediate prior to the phosgenation to the isocyanate unnecessary. After distilling off the solvent and diluting the reaction product with an inert organic solvent generally used in the phosgenation step, such as chlorobenzene, toluene, orthodichlorobenzene, nitrotoluene, and the like, the actual crude product can be phosgenated.

The temperature at which the addition reaction is carried out is generally governed by the boiling point of the solvent chosen. Preferably, however, the temperature is maintained between about 50° and 130° C.

The phosgenation is effected in the usual manner, for example, by the so-called cold phase-hot phase phosgenation described in Canadian Patent 537,484 or by the hydrochloride process which results in the corresponding amine hydrochloride being phosgenated. The phosgenation can be carried out either continuously or intermittently at temperatures ranging from between about —20° up to about 250° C. in the presence of an inert solvent.

Any suitable amino mercaptan having at least one primary amino group and one mercapto group may be used in the process of this invention to prepare the primary amine compound which contains thioether linkages. The primary amino group and mercaptan group are separated by at least one carbon atom and not more than 25 carbon atoms. Examples of amino mercaptans which may be employed are aminoethyl mercaptan, aminopropyl mercaptan, 3-aminothiophenol, aminothionaphthalene, thioglycolic acid β-aminoethyl ester, aminobutyl mercaptan, aminohexyl mercaptan, 2-chloro-4-aminothiophenol, and the like. The functionality of the isocyanate produced depends upon the choice of the starting materials and their ratios. An unsaturated compound with a double bond when reacted together with a mercaptan having one amino group yields a monoisocyanate. If one mol of an unsaturated compound with two double bonds is reacted with such a mono amino mercaptan, a diamine and finally a diisocyanate is produced. It is, of course, also possible to react one mol of an unsaturated compound having one double bond with an amino mercaptan having two $NH_2$ groups, which reaction obviously will also produce a diamine and thereafter a diisocyanate. As a rule mercaptans containing more than one $NH_2$ group will always produce polyvalent isocyanates. Starting compounds of this type include 3,5-diaminothiophenol-1, 1,4-diaminooctyl mercaptan-8, and the like.

The unsaturated compounds containing activated double bonds include compounds having the general formula:

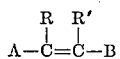

wherein R and R' represent a hydrogen atom or an organic radical, A represents a radical which will activate the double bond, such as, for example, —COOR, COR, —$SO_2$R, —$NO_2$, —$CONR_2$, —R—CR=CR, R—C≡C—, —$C_6H_5$, and the like, and B represents one of the same radicals as A, a hydrogen atom or any other organic radical. The organic radicals are preferebly alkyl radicals having from 1–20 carbon atoms, such as methyl, ethyl, propyl, butyl, isopropyl, isobutyl, hexyl, octyl, decyl, and the like, and aryl radicals such as phenyl, diphenyl, and naphthyl. The addition of the radicals represented by A above will activate the double bonds in the unsaturated compounds, thus causing them to preferentially react with the mercapto group.

Thus, any suitable compound having activated double bonds may be used, such as, for example, the methyl, ethyl, butyl esters of acrylic, crotonic, methacrylic, maleic, and fumaric acids; the corresponding esters of cinnamic acid, methyl vinyl ketone, benzal acetone, methyl vinyl sulphone, styrene, and the like. It is, of course, also possible to produce isocyanates of higher functionality by using as one of the starting components compounds containing activated double bonds several times in the molecule, such as, for example, acrylic or methacrylic acid bisglycol ester, maleic or fumaric acid polyesters, diphenyl sulphone, diphenyl benzene, and the like.

The isocyanates prepared in accordance with the process of this invention are valuable intermediates for the production of plastics by the isocyanate polyaddition process—that is, these isocyanates may be reacted with organic compounds containing active hydrogen atoms, such as, for example, polyhydric polyalkylene ethers or hydroxyl polyesters, to produce homogeneous elastomeric products suitable for use in the preparation of articles such as automobile tires, gears, grease retainers for ball joints, shoe heels and soles, and the like. These isocyanates can also be used for the preparation of cellular polyurethane products which are useful in the manufacture of upholstered furniture, cushions, pillows, mattresses, sound and heat insulating barriers, and the like.

The invention is further illustrated but not limited by the following examples, in which parts and percentages are by weight unless otherwise specified.

EXAMPLE 1

Preparation of 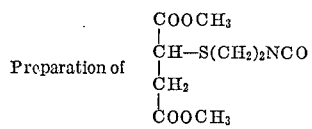

About 65 parts of mercaptoethylamine hydrochloride are dissolved in about 300 parts by volume of methanol and separated by suction-filtering from the undissolved substances. About 4 parts by volume of piperidine are added, and about 72 parts of dimethyl maleinate are then added dropwise. The mixture is thereafter boiled for about 5 hours under reflux. After cooling, the product is suction-filtered and methanol is distilled off in vacuo while stirring. About 125 parts of a thick oil remain, this oil being soluble in water.

The total quantity of the oil thus obtained is suspended in about 1 liter of chlorobenzene and thereafter heated to form about 80° to about 100° C. while introducing phosgene. After a phosgenation period of about 3 hours, almost complete dissolution has occurred. The solution is suction-filtered concentrated, and the isocyanate is distilled under high vacuum. $B.P._{0.1}$ 120–130° C.

Analysis.—Calculated: C, 43.6%; H, 5.26%; N, 5.7%; S, 13.0%. Found: C, 43.4%; H, 5.26%; N, 6.3%; S, 13.3%.

EXAMPLE 2

Preparation of $OCN(CH_2)_2S(CH_2)_2$—$COOCH_3$

About 114 parts of mercaptoethylamine hydrochloride are dissolved in about 300 parts by volume of methanol and suction-filtered from the residue. About 86 parts of methyl acrylate and about 5 parts by volume of piperidine are then added. The mixture is boiled for about 5 hours under reflux and, after cooling, is suction-filtered from a small residue. The methanol is evaporated in vacuo while stirring. About 156 parts of a water-insoluble thick oil are obtained, which, after phosgenation in chlorobenzene under the same conditions as in Example 1, are distilled under high vacuum. $B.P._{0.6}$ 124–125° C.

EXAMPLE 3

Preparation of 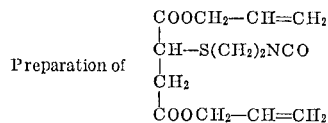

About 120 parts of mercaptoethylamine hydrochloride are dissolved in about 300 parts by volume of allyl alcohol and filtered from the undissolved substance. About 196 parts of diallyl maleinate and about 7 parts by volume of piperidine are then added. After boiling for about 5 hours under reflux, the substance is suction-filtered from a small quantity of undissolved substance. There remains about 295 parts of a thick water-soluble oil, which, after phosgenation as in Example 1 and evaporation of the solvent, gives the following analysis.

$B.P._{0.15}$ 160–170° C.

Analysis.—Calculated: C, 52.1%; H, 5.7%; N, 4.96%; S, 10.7%. Found: C, 51.25%; H, 5.79%; N, 4.72%; S, 10.4%.

It is, of course, to be understood that the scope of the invention is not to be limited by the specific examples set forth herein but that any of the compounds set forth above may be utilized in place of those specifically used in the examples. For example, any of the unsaturated compounds or amino mercaptans listed above may be used in place of those of the examples.

Although the invention has been described in considerable detail for the purpose of illustration, it is to be understood that variations can be made by those skilled in the art without departing from the spirit of the invention.

What is claimed is:

1. A compound having the formula

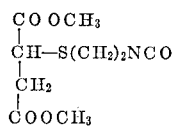

2. A compound having the formula

3. A compound having the formula
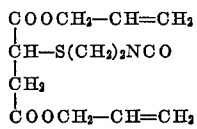
References Cited
UNITED STATES PATENTS
2,340,757  2/1944  Kaase et al. _____ 260—453
3,075,967  1/1963  Krapcho _____ 260—578 XR
OTHER REFERENCES
Siefken: Annalen der Chemie, vol. 562, page 89 relied upon (1948).
CHARLES B. PARKER, Primary Examiner
DOLPH H. TORRENCE, Assistant Examiner
U.S. Cl. X.R.
260—2.5, 75, 77.5, 465.5, 469, 470, 475, 482, 485, 486, 516, 534, 558, 561, 578, 583